United States Patent
Zhao et al.

(10) Patent No.: US 6,636,305 B2
(45) Date of Patent: Oct. 21, 2003

(54) APPARATUS AND METHOD FOR PRODUCING A SUBSTANTIALLY STRAIGHT INSTRUMENT IMAGE

(75) Inventors: Jun Zhao, Albuquerque, NM (US); Fritz S. Allen, Corrales, NM (US)

(73) Assignee: New Chromex, Inc., Albuquerque, NM (US)

(*) Notice: Subject to any disclaimer, the term of this patent is extended or adjusted under 35 U.S.C. 154(b) by 40 days.

(21) Appl. No.: 09/951,467

(22) Filed: Sep. 13, 2001

(65) Prior Publication Data

US 2003/0071993 A1 Apr. 17, 2003

(51) Int. Cl.⁷ .................................................. G01J 3/28
(52) U.S. Cl. ........................ 356/300; 356/326; 356/328
(58) Field of Search .................................. 356/300–334

(56) References Cited

U.S. PATENT DOCUMENTS

| | | | |
|---|---|---|---|
| 2,757,568 A | * 8/1956 | Fastie | 356/328 |
| 2,922,331 A | * 1/1960 | Fastie et al. | 356/328 |
| 3,936,191 A | 2/1976 | Chupp | 356/101 |
| 4,017,185 A | 4/1977 | Chupp | 356/96 |
| 4,575,243 A | 3/1986 | Witte | 356/333 |
| 4,634,276 A | 1/1987 | Sharpe | 356/305 |
| 4,649,557 A | 3/1987 | Hornstra et al. | 378/84 |
| 4,690,559 A | 9/1987 | Florek et al. | 356/328 |
| 4,773,756 A | * 9/1988 | Blechinger | 356/334 |
| 4,776,696 A | 10/1988 | Hettrick et al. | 356/328 |
| 5,000,570 A | 3/1991 | Neilson et al. | 356/308 |
| 5,212,537 A | * 5/1993 | Birang et al. | 356/300 |
| 5,436,723 A | 7/1995 | Kunselman et al. | 356/307 |
| 5,517,302 A | 5/1996 | Stearns et al. | 356/326 |
| 5,880,834 A | 3/1999 | Chrisp | 356/328 |
| 6,005,661 A | 12/1999 | Machler | 356/326 |
| 6,023,330 A | 2/2000 | Marshall et al. | 356/328 |
| 6,031,608 A | 2/2000 | VonBargen et al. | 356/308 |
| 6,100,974 A | 8/2000 | Reininger | 356/300 |
| 6,104,029 A | 8/2000 | Coxon et al. | 250/305 |
| 6,181,418 B1 | 1/2001 | Polumbo et al. | 356/328 |

\* cited by examiner

*Primary Examiner*—Zandra V. Smith
(74) *Attorney, Agent, or Firm*—Ray R. Regan

(57) ABSTRACT

An apparatus and method for producing a substantially straight instrument image is provided. The apparatus and method for producing a substantially straight instrument image, according to the present invention includes a curved slit. The curved slit may be formed in a light beam controller. The curved slit is capable of admitting a light beam into the instrument. The instrument parameters associated with optical devices located in the instrument in the path of the light beam are determined. One or more formulae are used to transform and process the instrument spectral parameters to determine the shape or curvature of the curved slit.

21 Claims, 7 Drawing Sheets

APPARATUS AND METHOD FOR PRODUCING A SUBSTANTIALLY STRAIGHT INSTRUMENT IMAGE

FIELD OF THE INVENTION

The present invention pertains generally to the field of spectroscopy. More particularly, the new and useful invention claimed in this document pertains to an apparatus and method for producing a substantially straight image produced by a spectrograph, monochromator, or a similar optical measurement device (collectively in this document, "instrument"). The apparatus and method for producing a substantially straight instrument image in a spectrally dispersed focal plane is particularly, but not exclusively, useful for inducing image curvature adjustments to spectral data associated with a light or radiation signal (collectively, "light beam") by providing entrance slit configurations to overcome curvature, coma, astigmatism and other optical spectroscopy measurement and instrumentation aberrations to the signal shape (collectively, "aberrations").

BACKGROUND OF THE INVENTION

Spectroscopy is a general term for the process of measuring energy or intensity as a function of wavelength in a beam of light or radiation. Many conventional instruments, including spectroscopes, include basic features and components such as an entrance slit, a collimator for producing a parallel beam of radiation; one or more prisms, mirrors, gratings, reflectors and similar components for receiving and dispersing radiation through differing angles of deviation based on wavelength; an exit slit or an apparatus for collecting spectral data; and perhaps apparatus for displaying and adjusting the image of the dispersed radiation. At least one application of spectroscopy is to use absorption, emission, or scattering of electromagnetic radiation by atoms, molecules or ions to qualitatively and quantitatively study physical properties of matter.

For purposes of both qualitative and quantitative analyses of physical matter, a light beam may be admitted at varying angles into an instrument through an entrance slit, directed through, past, or at one or more prisms, mirrors, reflectors, gratings and other electronic and optical devices (collectively, "instrument components") producing one or more beams of light or radiation that may be directed at a sample of the physical matter (collectively, "incident radiation") to in turn produce one or more beams from which to measure property characteristics of a sample (collectively, "resultant beam"). A resultant beam may provide one or more frequencies associated with the sample, as well as the intensities of those frequencies. The frequencies and intensities may be used to identify chemical characteristics of a sample, and resultant spectral data my be collected by any of a variety of detectors, such as a charge coupled device. Spectral data also may be adjusted by algorithms, mathematical formulae, or other means to present the shape of the resultant beam spectral data on an electronic display such as a computer screen.

Efforts to display and present images of a resultant beam have not always resulted in uniform, predictable results, or in acceptable levels of precision and accuracy of spectral measurements. At least one problem is that spectroscopic measurements may be affected by the instrument itself. One or more of the instrument components may contribute to undesirable instrumentation variabilities that affect spectral data measured by the instrument. Problems associated with instruments and methods used to employ phenomena associated with the Raman shift have been addressed and resolved in exemplary fashion by the apparatus and methods shown in U.S. Pat. No. 6,141,095 issued on Oct. 31, 2000 to Allen, et al., and in U.S. Pat. No. 6,281,971 B1, issued on Aug. 28, 2001 to Allen, et al. Until the present invention, however, at least one problem persisted, namely presenting one or more useful and desirable shapes of images from light beams passing through an instrument. Providing substantially straight images from light beams admitted to an instrument through a curved entrance slit in a spectrally dispersed focal plane in an on-axis instrument, without affecting spectral resolution, has presented a number of perplexing problems.

Converting spectral data that has passed through a number of chemical, electronic, electrical and optical devices, and doing so rapidly and accurately, while providing consistently reliable human-readable images with high resolution, may be affected by the instrument itself, by the shape of the entrance slit of an instrument, by angles of incidence of a light beam entering an instrument, by the wavelength of the light beam, by diffraction orders, by diffraction angles, by the focal length of mirrors and lenses, and by related parameters (collectively, in this document, "instrument spectral parameters").

Depending on the optical elements selected to configure an instrument, a dispersive instrument may be either on-axis or off-axis. An on-axis dispersive spectrometer, however, generally is one based primarily on lenses, although such an instrument also may include one or more mirrors. As used in this document, the term "on-axis" generally refers to an instrument in which the optical elements are oriented so that the axes of the optical elements are substantially co-linear with the center of a light beam passing through or past the optical elements. Use of a dispersive on-axis instrument having a straight or substantially straight entrance slit tends to yield a curved image. In off-axis spectrometers, image curvature may be caused at least by the arrangement and orientation of the optical elements which are oriented so that the axes of the optical elements are not substantially co-linear with the center of a light beam passing through or past the optical elements. The term "off-axis" as used in this instrument generally refers to an instrument that is primarily mirror based, and in which the optical elements are oriented so that the axes of the optical elements are not substantially co-linear with a light beam passing through or past the optical elements. In an off-axis instrument system, the axis of symmetry with respect to reflective surfaces generally forms an angle with regard to each other and with regard to light reflected from the mirrors. As used in this document, the terms "on-axis" and "off-axis" are used not to limit the scope of the present invention, but simply to clarify industry differences in the way instrument components, particularly the orientations and arrangement of optical elements, may be assembled. FIGS. 1A and 1B are useful in appreciating the difference between an off-axis mirror based instrument, and on-axis lens-based instrument. As shown in FIG. 1A, an off-axis mirror-based instrument is shown with a light beam entering through an entrance slit. The light beam is collimated by an off-axis Mirror A, diffracted by a Grating, then focused on a detector by a second off-axis Mirror B. A conventional on-axis lens-based instrument is shown in FIG. 1B, which shows a light beam entering an entrance slit of the instrument. The light beam is collimated by an on-axis Lens A, dispersed by a Dispersive Element, in this case a prism, and focused on a detector by a second on-axis Lens B.

Mirrors are reflective and therefore difficult to use in an on-axis environment. Accordingly, mirrors are usually used in an off-axis environment, but are known to introduce one or more image aberrations. Lenses, on the other hand, are transmissive, and therefore may be used in an on-axis environment to substantially eliminate off-axis aberrations. Lenses, however, are not typically used in spectrographs or monochromators where the intent is to cover a wide range of wavelengths because lenses have chromatic aberrations which cause light beams of different wavelengths to have different focal lengths. On the other hand, if an intended application involves a substantially narrow spectral window, so that chromatic aberration is not significant, as in Raman spectroscopy, lenses may be used in an on-axis environment to yield superb imaging quality.

An exit slit in a monochromator, as opposed to an entrance slit, maybe located at a spectrally dispersed focal plane. A single detector may be used to collect one data point at a time of the spectrum. An entire spectrum may be collected sequentially by scanning an instrument component such as a grating or slit. If both the entrance slit and the exit slit are substantially rectangular, a curvature will result in reduced resolution of the resulting image if a significant portion of the exit slit is used during analysis of a sample.

A spectrograph, however, generally does not employ an exit slit. Rather, a multi-channel detector including by way of example, but not of limitation, a charge coupled device, or a linear diode array, may be used to collect a portion of a light spectrum simultaneously. Such multi-channel detectors often include a two dimensional rectangular matrix. Such a detector usually is oriented so that the x-axis dimension coincides with the intersecting line of the dispersion plane and the focal plane, and the y-axis dimension remains parallel to the entrance slit of the spectrograph. Light or radiation falling on the same columns of the detector array may be added together to enhance sensitivity, or may be dissected into sections that represent spectral data emanating from different locations on or along the entrance slit. Because of the induced slit curvature, integrating the beam or resultant beam vertically results in loss of resolution, while dissecting the signal into sections will result in spectral data with shifted wavelength axes.

Various apparatus and methods attempting to overcome these problems, and seeking to produce high spectral resolution of images that result in reliable, accurate, human-readable images that eliminate aberrations, have been suggested. Straight, curved, or even circular entrance slits have been proposed. Within the array of optical spectroscopy measurement instruments, efforts to achieve a straight image from an instrument application have included reshaping either the entrance slit, the exit slit, or both; reforming the shape of instrument components within the instrument, such as curving the image plane in a prescribed manner; orienting the dispersing plane at or in a prescribed attitude or relationship to the image plane; imaging spectral data along prescribed shapes on one or more variously configured imaging planes; segmenting various surfaces of instrument components to later reassemble the image spectral data as an image; varying the wavelength of light or radiation; varying the focal lengths of mirrors in the case of off-axis instruments; employing a multiplicity of slits, one or more of which may be variously configured; rearranging various angles of incidence among instrument components so as to alter the light beam itself; and using one or more iterations of all of those suggested solutions.

Thus, many devices and methods proposed to solve the problem have employed either a straight entrance slit in an on-axis environment, or a curved entrance slit in an off-axis environment. No solution, however, has been suggested that provides an apparatus and method employing a curved entrance slit in an on-axis environment, plus a combination of formulae to adjust the beam to produce a substantially straight instrument image. None of the suggested approaches provide a method and apparatus that induces image curvature adjustments to spectral data associated with a light beam by providing an entrance slit configuration to overcome the optical element problems caused by instrument components and aberrations.

Therefore, a previously unaddressed need exists in the industry for a new and useful apparatus and method for producing a substantially straight instrument image to assist in qualitative and quantitative analyses of a sample. Particularly, there is a significant need for a method and apparatus that provides image curvature adjustments to spectral data associated with a light beam by providing the entrance slit configuration to overcome curvature, coma, astigmatism and other optical spectroscopy measurement aberrations to the signal shape.

SUMMARY OF THE INVENTION

Given the conventional solutions for attempting to solve the problems associated with providing a substantially straight image from a dispersive instrument, it would be desirable, and of considerable advantage, to provide an apparatus, and method for making an apparatus, capable of providing substantially straight images in a dispersed focal plane, and which allows use of a variety of detectors, including, without limitation, a two dimensional detector array, all without affecting spectral resolution.

The present invention provides numerous advantages over prior suggested solutions. At least one of the advantages of the present invention is that it provides an apparatus and a method for producing a substantially straight instrument image in a spectrally dispersed focal plane.

Another advantage of the present invention is that it provides the substantially straight image in an imaging spectrometer using on-axis optics and a curved entrance slit to yield the substantially straight slit images.

Yet another advantage of the present invention is that it provides analytical formulae to transform instrument spectral parameters to provide the optimum entrance slit shape for any combination of optical parameters. This advantage is one of the significant advances over the present technology. By applying the present invention, substantially straight images are now instrument independent. Regardless of the optical elements included in an instrument, a designer of the instrument will know the instrument spectral parameters associated with the optical elements of a particular instrument. Application of the formulae included in the present invention to transform instrument spectral parameters will yield a substantially straight image, regardless of the combination of optical elements included in the particular instrument.

The present invention also permits use of a variety of detectors, including a two dimensional detector array, without loss of spectral resolution.

Yet another advantage of the present invention is an apparatus and method for producing a substantially straight instrument image which respectively are easy to use and to practice, and which are cost effective for their intended purposes.

These and other advantages are achieved in the present invention by providing an on-axis instrument that includes a curved entrance slit. In a preferred embodiment of the present invention, a light beam controller is provided that includes a curved entrance slit to admit one or more beams of light. Means operably connectable to the light beam controller are provided for directing a beam of light into the instrument through the light beam controller. The provision of a light beam controller, however, is not a limitation of the present invention. Any number of structural elements may be used in connection with a particular instrument to provide at least one curved entrance slit in connection with the instrument. As used in this document, the term "curved" is used in contradistinction to the term "substantially straight." A plurality of instrument components may be mountable in the path of the light beam, as well as means for collecting image data, such as a detector. Formulae and equations for transforming the one or more beams of light to a substantially straight image also are provided.

As stated, an apparatus and method for producing a substantially straight instrument image, according to at least one embodiment of the present invention, may include a light beam controller. The light beam controller is formed with a housing having a distal end and an proximal end. A curved entrance slit is formed in the proximal end of the housing. Any number of alternative curved entrance slits may be employed. The curved entrance slit, for example, may be shaped as an arcuate channel having opposing curve ends, and jaws may be positioned in the arcuate channel. Alternatively, a waveguide shaped as a curved slit may be inserted in the instrument. If the curved slit is formed in a light beam controller, one or more leads may be inserted into the distal end of the light beam controller. The one or more leads may be one or more fiber optic leads operably connectable to the distal end of the housing.

A light beam may be directed into the instrument through the light beam controller. One or more optical devices are contained in the instrument and located in the path of the light beam. The optical devices may include at least one lens. A plurality of lenses may be arranged on-axis. Other optical devices may be included, such as a grating. In addition, one or more detectors are positioned in the path of the light beam for collecting image spectral data from the light beam. By way of example, but not of limitation, a detector may be a multi-channel device for collecting spectral data. The detector also may be a single channel device. In addition, a charge coupled device may be used, as well as a diode.

By applying one or more formulae to the instrument spectral parameters, the shape and configuration of the entrance slit may be configured to produce a substantially straight image. The theoretical basic formula to determine curvature of an image of the slit is the equation:

$$m\lambda = d\cos\gamma(\sin\alpha + \sin\beta), \qquad (1)$$

where m is the diffraction order, $\lambda$ is wavelength, d is a distance between adjacent grooves on a grating, $\alpha$ is an incident angle, $\beta$ is a diffraction angle, and $\gamma$ is the angle formed between a collimated light beam and the dispersive plane, and is related to the collimating lens focal length identified by $f_1$ and the point source height h' on the entrance slit by the formula:

$$\tan\gamma = \frac{h'}{f_1} \qquad (2)$$

It will be evident to those skilled in the art that transforming instrument spectral parameters using equation (1) in an instrument having a straight entrance slit will yield a curved image. If, however, a straight image is desired at the detector focal plane, the instrument entrance slit must be curved.

Accordingly, a derived formula and equation may be used for determining the substantially straight image at the detector to determine the required shape of the slit using the equation $$x = cy^2, \qquad (3)$$

where c is a coefficient and $$c = \frac{m\lambda}{2df_1\cos\alpha},$$

and $f_1$ is the focal length of at least one collimating lens. As will be evident to those skilled in the art, the application of formula (2) suggests that the optimum shape of an instrument entrance slit that will yield a substantially straight image is a parabolic curve.

In addition, however, an approximating formula can be derived from formula (1) that will provide an instrument entrance slit configuration in the form of an arc or portion of a circle whose radius will be determinable by the formula:

$$r = 1/[2c] + 1/8ch^2, \qquad (4)$$

where h is the height of the slit.

Thus, it is clear from the foregoing that the claimed subject matter as a whole, including the structure of the apparatus, and the cooperation of the elements of the apparatus, as well as the method provided, combine to result in a number of unexpected advantages and utilities of the present invention. Those advantages include providing an apparatus and a method for producing a substantially straight instrument image in a spectrally dispersed focal plane. The present invention also provides a substantially straight image in an imaging spectrometer using on-axis optics and curved entrance slit to yield the substantially straight slit images. In addition, analytical formulae may be used to calculate the dimensions of the optimum entrance slit shape for any instrument. The invention permits use of a variety of detectors, including a two dimensional detector array, without loss of spectral resolution.

The foregoing has outlined broadly the more important features of the invention to better understand the detailed description which follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for purpose of description, and should not be regarded as limiting.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The advantages and other objects of the present invention, and features of such a an apparatus and method for producing a substantially straight instrument image, will become apparent to those skilled in the art when read in conjunction with the accompanying following description, drawing figures, and appended claims. The novel features of this invention, and the invention itself, both as to structure and operation, are best understood from the accompanying drawing, considered in connection with the accompanying description of the drawing, in which similar reference characters refer to similar parts, and in which:

DESCRIPTION OF THE PREFERRED EMBODIMENTS

Briefly, the present invention provides an apparatus and method for producing a substantially straight instrument image. In a preferred embodiment of the present invention, a light beam controller is provided that includes a curved entrance slit to admit one or more beams of light into the instrument. Means operably connectable to the light beam controller are provided for directing a beam of light into the instrument through the light beam controller. One or more leads is inserted into the distal end of the light beam controller. The one or more leads may be one or more fiber optic leads operably connectable to the distal end of the housing. In the embodiment that includes a light beam controller, a curved entrance slit is formed in the proximal end of the light beam controller. The entrance slit also may be shaped as an arcuate channel having opposing curve ends, and jaws may be positioned in the arcuate channel. Alternatively, a waveguide shaped as a curved slit is insertable into the instrument for admitting one or more beams of light. The provision of a light beam controller, however, is not a limitation of the present invention. Any number of structural elements may be used in connection with a particular instrument to provide at least one curved entrance slit in the instrument. A light beam may be directed into the instrument through a curved entrance slit or the light beam controller. One or more optical devices are contained in the instrument and located in the path of the light beam. In addition, one or more detectors are positioned in the path of the light beam for collecting image spectral data from the light beam.

By applying one or more formulae to the instrument spectral parameters, the shape and configuration of the entrance slit may be shaped to produce a substantially straight image. The present invention, therefore, is useful for providing substantially straight images from the spectral data in a dispersed focal plane, and which allows use of any of a number of detectors, including without limitation a two dimensional detector array, all without affecting spectral resolution.

Figure 1A:
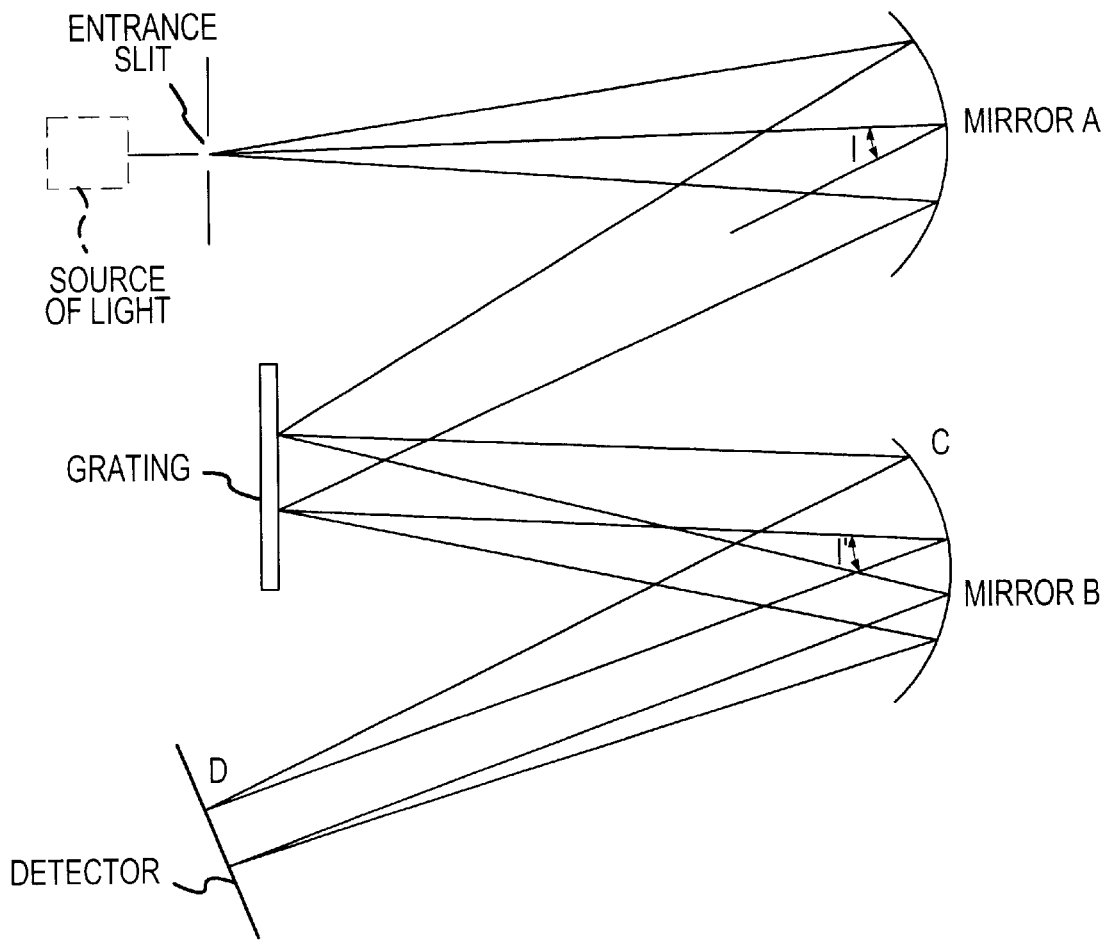
FIG. 1A is a schematic partial view of a typical off-axis instrument.
Figure 1B:
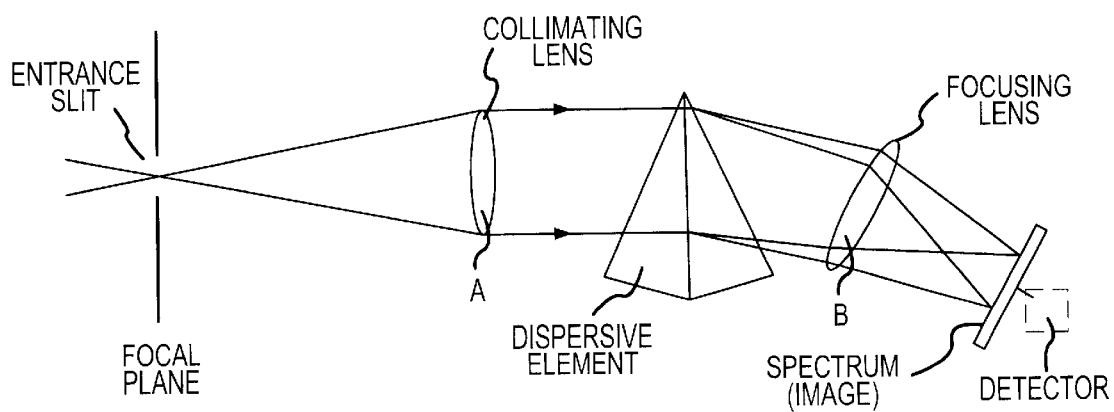
FIG. 1B is a schematic partial view of a typical on-axis instrument.

FIG. 1A illustrates a schematic partial view of a typical off-axis instrument, and FIG. 1B is a schematic partial view of a typical on-axis instrument. FIGS. 1A and 1B are useful in appreciating the difference between an off-axis mirror based instrument, and on-axis lens-based instrument. As shown in FIG. 1A, an off-axis mirror-based instrument is shown with a light beam entering through an entrance slit. The light beam is collimated by an on-axis Mirror A, diffracted by a Grating, then focused on a detector by a second off-axis Mirror B. A conventional on-axis lens-based instrument is shown in FIG. 1B, which shows a light beam entering an entrance slit of the instrument. The light beam is collimated by an on-axis Lens A, dispersed by a Dispersive Element, in this case a prism, and focused on a detector by a second on-axis Lens B. As also shown in FIG. 1A, the concave surfaces of the mirrors are capable of reflecting light from a light source shown by the legend "Source of Light" on FIG. 1A. The Source of Light may project a light beam onto the concave surface of a mirror shown as Mirror A in FIG. 1A. As indicated, Mirror B and Mirror A are off-axis, in that the axes of symmetry of the two mirrors are not co-linear with the center of the light beam the mirrors are reflecting. In the off-axis instrument as exemplified by FIG. 1A, a light beam may be reflected through angles I and I' to present an Image on a Detector, collector or similar device for displaying an image.

Figure 2A:
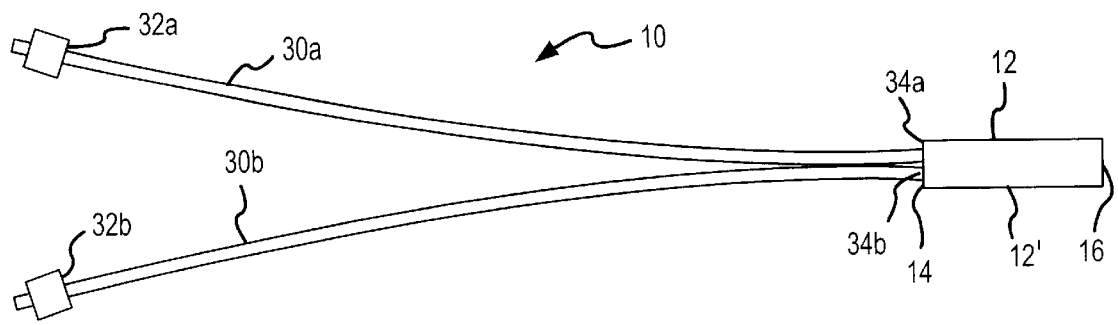
FIG. 2A is a top view of a light beam controller in accordance with one embodiment of the present invention.

According to the present invention, an apparatus and method for producing a substantially straight instrument image is shown in part in FIG. 2A, which illustrates in schematic form a light beam controller 10 according to the present invention. As shown, light beam controller 10 includes a housing 12. Housing 12 is formed with a distal end 14 and a proximal end 16. In a preferred embodiment of the present invention, housing 14 is presented in the shape of a cylinder 12' having distal end 14 and proximal end 16 at the respective ends of the cylinder. The shape, however, of housing 12 is not a material consideration of the present invention. In the preferred embodiment of the present invention, housing 12 is approximately 1.0 inch in length between distal end 14 and proximal end 16 of housing 12. The dimensions, however, of the preferred embodiment are not a material limitation on the present invention. Further, the use of light beam controller 10 is but one embodiment of the present invention.

Figure 2B:
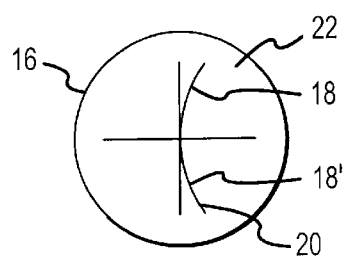
FIG. 2B is a front view of the surface of the proximal end of the housing of a light beam controller.
Figure 2C:
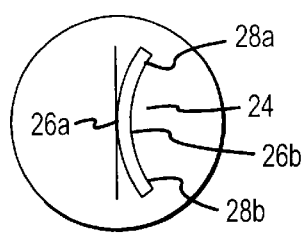
FIG. 2C also is a front view of the surface of the proximal end of the housing of a light beam controller emphasizing the potential for jaws in the slit.

As shown in FIG. 2B, a slit 18 is formed in proximal end 16 of housing 12. As shown in FIG. 2A, slit 18 is an entrance slit 18' to an instrument (not shown). As shown, entrance slit 18' is formed in proximal end 16 of housing 12. Entrance slit 18', according to the present invention, is curved. As also shown in FIG. 2B, a front view of proximal end 16 of housing 12 of light beam controller 10, entrance slit 18' is shown as a curved entrance slit 20. Curved entrance slit 20 is shown to be located approximately in the center of the circular surface 22 of proximal end 16 of housing 12. In a preferred embodiment of the present invention, circular surface 22 of proximal end 16 is approximately 0.5 inch in diameter. The diameter of circular surface 22 is, however, not a material consideration in connection with the present invention. Curved entranced slit 20 also may be shaped as an arcuate channel 24 as shown in FIG. 2C. As shown in FIG. 2C, arcuate channel 24 may have opposing curved sides 26a,b. Jaws 28a,b may be positioned in opposing curved sides 26a,b of arcuate channel 24. In at least another alternative embodiment of the present invention, an apparatus and method for producing a substantially straight image may include a wave guide (not shown) shaped as curved slit 18' insertable in proximal end 16 of housing 12 of light beam controller 10.

Figure 3:
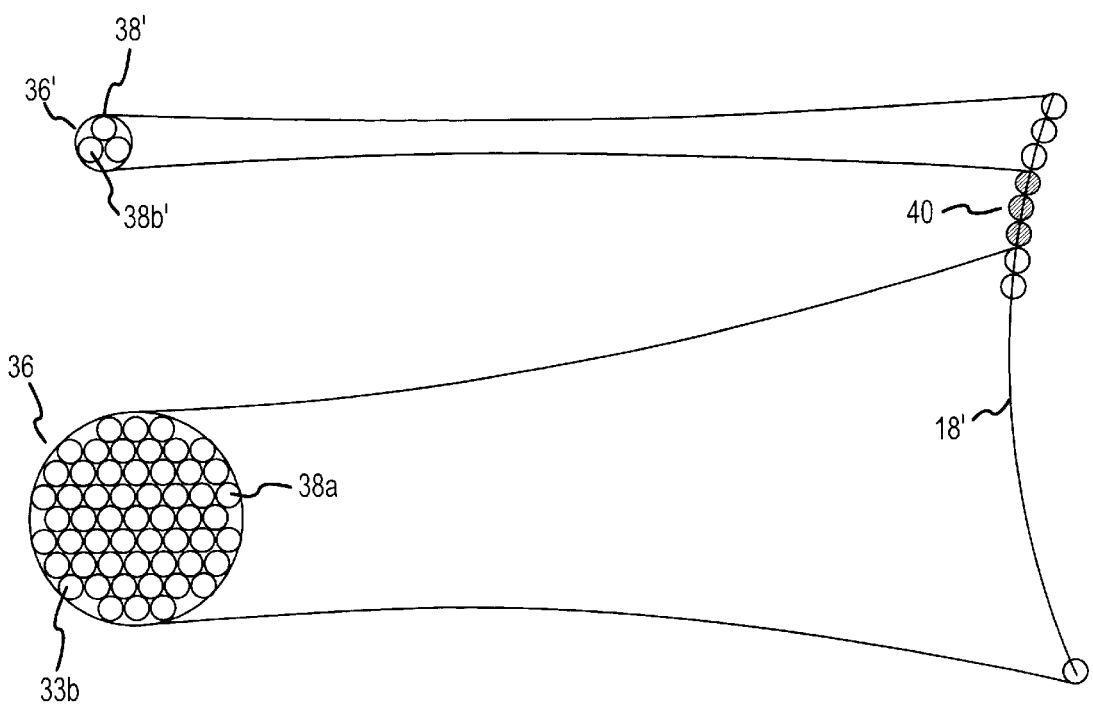
FIG. 3 is a schematic view of the front view of a representative fiber optic bundle mounted in a slit of a light beam controller.

Also included in a preferred embodiment of the present invention are one or more leads 30a,b formed with a leading end 32 and a following end 34, as shown best in FIG. 2A. Following ends 34a,b, in accordance with the preferred embodiment of the present invention, extend through distal end 14 of housing 12 of light beam controller 10. Leading end 32a,b are insertable into instrument components (not shown) that direct a light beam through entrance slit 18' of light beam controller 10. In the preferred embodiment of the present invention, each of the one or more leads 30a,b is approximately 5.75 inches in length. The length of lead 30 is, however, not a material consideration to the present invention. In a preferred embodiment of the present invention, the one or more leads 30a,b consist of fiber optic bundles 36 as shown in FIG. 3. As shown in FIG. 3, which is a schematic view of a representative fiber optic bundle 36, fiber optic bundle 36 is shown to be mounted in slit 18' of light beam controller 10. As further shown in FIG. 3, fiber optic bundle 36 may include a plurality of fiber optic leads 38a,b. As shown, fiber optic bundles 36 and 36' are formed in an array of fiber optic bundles 40 in entrance Slit 18' in proximal end 16 of housing 12 of light beam controller 10. In a preferred embodiment of the present invention, array of fiber optic bundles 40 includes 60 fibers, including three that are non-functional or dead, arranged in a 50/55/65 core/clad/buffer arrangement on a 3.9 plus/minus 0.1 mn long arc of 62 mn radius. As will be evident to a person skilled in the art, however, the precise arrangement of array of fiber optic bundles 40 is not a material consideration to the present invention, nor is the shape of distal end 14 of the present invention. As indicated, the other end (not shown) of an array of fiber optic bundles 40, exemplified by leading end 32 of leads 30a,b in FIG. 2A, are insertable into other components of the instrument (not shown).

Figure 4:
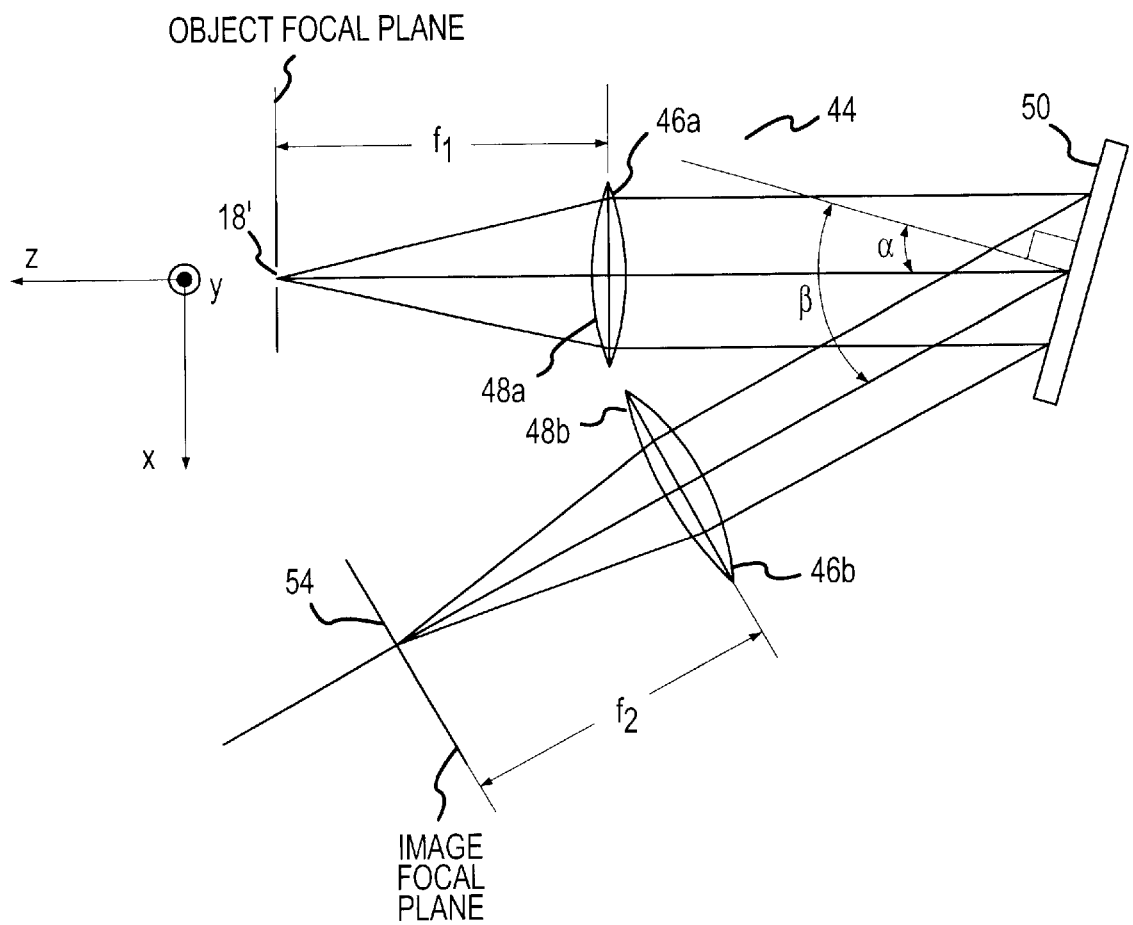
FIG. 4 is a schematic view of a portion of a dispersive instrument showing the variables to be calculated using the formulae of the present invention.

As further shown in FIG. 4, a schematic view of a portion of a dispersive on-axis instrument, a light beam diagrammatically shown as light beam 42 may be directed into an instrument 44 through light beam controller 10. One or more optical devices 46 are included in instrument 44, but for purposes of describing the present invention, FIG. 4 shows primarily one or more lenses 48a,b as the one or more optical devices 46. Also shown in FIG. 4 is at least one grating 50. Also shown diagrammatically in FIG. 4 is yet another optical device 46 identified as detector 52. Detector 52 is located along image focal plane 54. In accordance with the present invention, one or more detectors 52 may be positioned in the path of light beam 42. Detector 52 is included in instrument 44 for collecting image spectral data from light beam 42. By way of example, but not of limitation, detector 52 may be a single-channel or multi-channel device for collecting image spectral data. Detector 52 may also be a charge coupled device. As a charge coupled device, detector 52 may include a diode.

Figure 5:
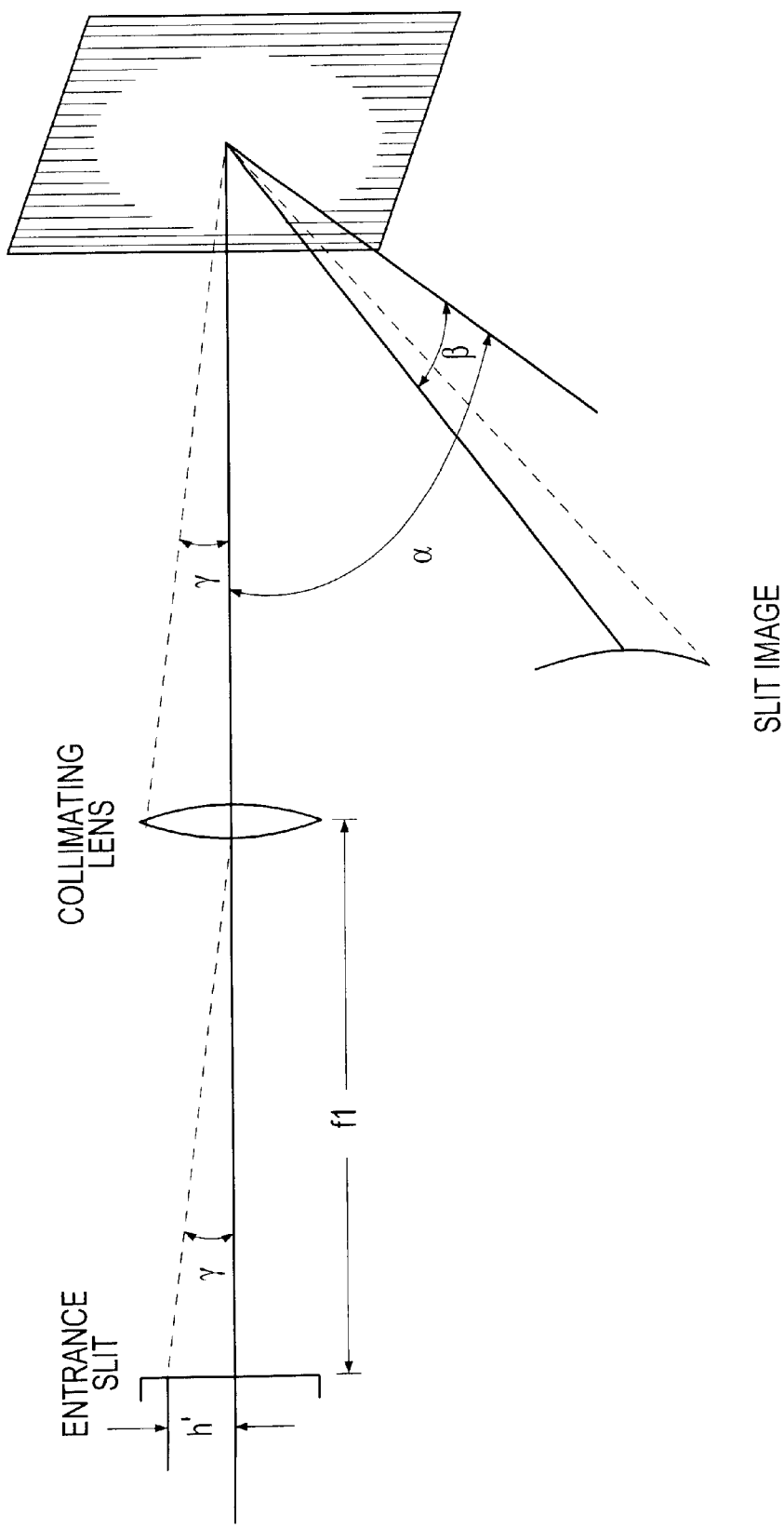
FIG. 5 is a schematic view of a straight entrance slit and the resulting curved slit image resulting from instrument spectral parameters unadjusted by formulae of the present invention.
Figure 6:
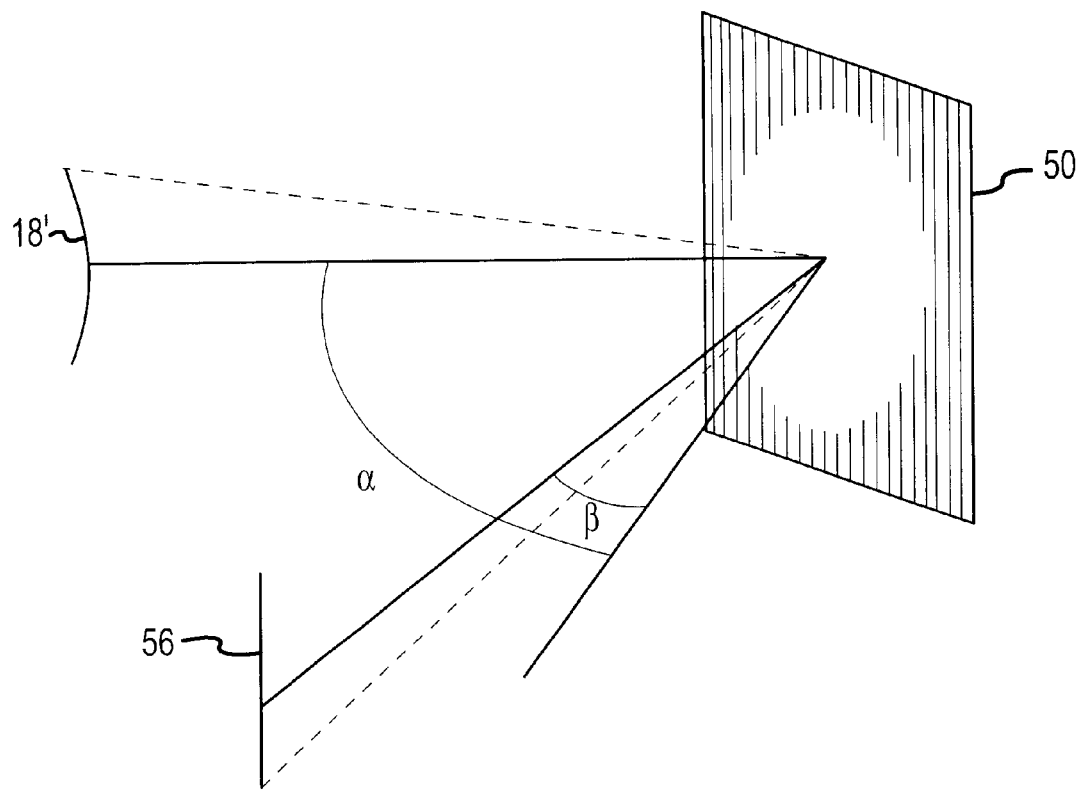
FIG. 6 is a schematic view of results of the present invention applied to a curved entrance slit to provide a substantially straight image.

In operation, by applying one or more formulae to the instrument spectral parameters, the shape and configuration of entrance Slit 18' may be configured to produce a substantially straight image 56 on detector 52 from instrument spectral parameters. As shown in FIG. 5, before application of the transformative formulae of the present invention, a light beam 42c entering into an instrument through substantially straight slit 18 would produce substantially curved image 58. After application of the transformative steps of the present invention, however, the shape of slit 18 is configurable to shape 18', as perhaps best shown in FIG. 6, to produce substantially straight image 56. Thus, to the instrument spectral parameters transforming steps are applied. The transforming steps includes the substep of deriving a formula from the theoretical formula for determining the curvature of the image of slit 18 using the equation $m\lambda = d\cos\gamma(\sin\alpha + \sin\beta)$, where m is the diffraction order, $\lambda$ is wavelength, d is a distance between adjacent grooves on a grating, $\alpha$ is an incident angle, $\beta$ is a diffraction angle, and $\gamma$ is the angle formed between a collimated light beam and the dispersive plane, and is related to the collimating lens focal length identified by $f_1$ and the point source height h' on the entrance slit by the formula:

$$\tan\gamma = \frac{h'}{f_1}$$

It will be evident to those skilled in the art that transforming instrument spectral parameters using the latter equation in an instrument having a straight entrance slit will yield a curved image. If, however, a straight image is desired at the detector focal plane, the instrument entrance slit must be curved.

Accordingly, a derived formula and equation may be used for determining the substantially straight image at the detector to determine the required shape of the slit using the equation $$x = cy^2, \qquad (1)$$

where c is a coefficient and $$c = \frac{m\lambda}{2df_1\cos\alpha},$$

and $f_1$ is the focal length of at least one lens 48.

As will be evident to those skilled in the art, the application of formula (1) suggests that the optimum shape of instrument entrance slit 18 that will yield substantially straight image 56 is a parabolic curve.

In addition, however, an approximating formula can be derived from formula (1) that will provide an instrument entrance configuration for slit 18 in the form of an arc or portion of a circle whose radius will be determinable by the formula:

$$r = 1/[2c] + 1/8ch^2, \qquad (2)$$

where h is the height of slit 18.

As will be evident, the purpose for inserting the brackets around "2c" is to enhance the clarity of the formula, i.e., to ensure that the formula is read as "1 divided by the product of 2 times c," and not as "one-half of c." It also will be evident that the amendments do not add new matter, but merely improve the clarity, readability, or understanding of the application or a portion of the application that was changed. Indeed, the amendments were made merely as cosmetic amendments to improve the readability and coherence of the resulting patent.

While the apparatus and method for producing a substantially straight image shown in drawing FIGS. 1A through 6 is one embodiment of the present invention, it is merely one such embodiment of the invention, is not intended to be exclusive, and is not a limitation of the present invention. While the particular apparatus and method for producing a substantially straight image as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

What is claimed is:

1. A method for producing a substantially straight instrument image, comprising:
   positioning a curved entrance slit in an on-axis instrument for admission of one or more light beams,
      wherein the positioning step includes the substeps of:
         shaping the slit as an arcuate channel having opposing curved sides; and
         positioning a jaw in each of the opposing curved sides;
   determining one or more instrument spectral parameters; and
   applying to the one or more instrument spectral parameters one or more formulae to determine the shape of the entrance slit.

2. A method for producing a substantially straight instrument image as recited in claim 1, wherein the entrance slit positioning step includes:
   providing a housing having a distal end and an proximal end; and
   connecting operatively one or more fiber optic leads to the housing at the distal end.

3. A method for producing a substantially straight instrument image as recited in claim 1, wherein the entrance slit positioning step further includes the substep of forming the curved entrance slit in the proximal end of the housing.

4. A method for producing a substantially straight instrument image as recited in claim 1, wherein the instrument spectral parameters applying step includes the substep of deriving one or more formulae from the equation $m\lambda = d \cos \gamma (\sin \alpha + \sin \beta)$, where m is the diffraction order, $\lambda$ is wavelength, d is a distance between adjacent grooves on a grating, $\alpha$ is an incident angle, $\beta$ is a diffraction angle, and $\gamma$ is the angle formed between a collimated light beam and the dispersive plane, and is related to the collimating lens focal length identified by $f_1$ and the point source height h' on the entrance slit by the formula:

$$\tan \gamma = \frac{h'}{f_1}.$$

5. A method for producing a substantially straight instrument image as recited in claim 1, wherein the instrument spectral parameters applying step includes the substep of determining the required shape of the slit using the equation $x = cy^2$, where c is a coefficient and $$c = \frac{m\lambda}{2 d f_1 \cos \alpha}$$

and $f_1$ is the focal length of the at least one lens.

6. A method for producing a substantially straight instrument image as recited in claim 1, wherein the instrument spectral parameters applying step includes the substep of determining the radius of curvature of the slit using the equation $r = 1/[2c] + 1/8ch^2$, where h is the height of the slit.

7. An apparatus for producing a substantially straight instrument image from a light beam, comprising:
   an on-axis instrument;
   a light beam controller formed with at least one curved slit for admitting the light beam into the on-axis instrument;
   a plurality of instrument optical devices operably connectable to the light beam controller, the plurality of instrument optical devices further providing one or more instrument spectral parameters; and
   means for transforming the instrument spectral parameters to configure the at least one curved slit to produce a substantially straight image,
      wherein the transforming means includes means for deriving one or more formulae from the equation $m\lambda = d \cos \gamma (\sin \alpha + \sin \beta)$, where m is the diffraction order, $\lambda$ is wavelength, d is a distance between adjacent grooves on a grating, $\alpha$ is an incident angle, $\beta$ is a diffraction angle, and $\gamma$ is the angle formed between a collimated light beam and the dispersive plane, and is related to the collimating lens focal length identified by f1 and the point source height h' on the entrance slit by the formula:

$$\tan \gamma = \frac{h'}{f_1}.$$

8. An apparatus for producing a substantially straight instrument image from a light beam as recited in claim 7, wherein the light beam controller includes a housing having a distal end and a proximal end.

9. An apparatus for producing a substantially straight instrument image from a light beam as recited in claim 8, wherein the light beam controller includes one or more leads for operatively connecting the distal end to the plurality of instrument optical devices.

10. An apparatus for producing a substantially straight instrument image from a light beam as recited in claim 7, wherein the plurality of instrument optical devices includes at least one lens.

11. An apparatus for producing a substantially straight instrument image from a light beam as recited in claim 7, further comprising a detector.

12. An apparatus for producing a substantially straight instrument image from a light beam as recited in claim 11, wherein the detector is a one-dimensional array.

13. An apparatus for producing a substantially straight instrument image from a light beam as recited in claim 11, wherein the detector is a charge coupled device.

14. An apparatus for producing a substantially straight instrument image from a light beam as recited in claim 7, wherein the instrument spectral parameters transforming means includes one or more formulae.

15. An apparatus for producing a substantially straight instrument image from a light beam as recited in claim 7, wherein the shape of the curved slit is defined by the equation $x = cy^2$, where c is a coefficient and $$c = \frac{m\lambda}{2 d f_1 \cos \alpha}$$

and $f_1$ is the focal length of the least one lens.

16. An apparatus for producing a substantially straight instrument image from a light beam as recited in claim 15, wherein the shape of the curved slit is further defined by equation $r = 1/[2c] + 1/8ch^2$, where h is the height of the slit.

17. A method for determining an entrance slit configuration for an on-axis instrument, comprising:
  positioning a housing in the on-axis instrument,
    wherein the housing positioning step includes the substep of proximal end in which a waveguide shaped as a curved slit is insertable;
  forming in the housing at least one curved slit for admitting a light beam into the instrument;
  installing one or more optical devices in the path of the beam;
  operatively connecting the at least one curved slit to the one or more optical devices;
  determining from the one or more optical devices instrument spectral parameters; and
  transforming the instrument parameters to configure the entrance slit to provide a substantially straight image.

18. A method for determining an entrance slit configuration for an on-axis instrument as recited in claim 17, wherein the housing positioning step includes the substep of providing a distal end for operatively connecting the housing to one or more of the optical devices.

19. A method for determining an entrance slit configuration for an on-axis instrument as recited in claim 17, wherein the instrument spectral parameters transforming step includes the substep of deriving one or more formulae from the equation $m\lambda = d \cos\gamma(\sin\alpha + \sin\beta)$, where m is the diffraction order, $\lambda$ is wavelength, d is a distance between adjacent grooves on a grating, $\alpha$ is an incident angle, $\beta$ is a diffraction angle, and $\gamma$ is the angle formed between a collimated light beam and the dispersive plane, and is related to the collimating lens focal length identified by f1 and the point source height h' on the entrance slit by the formula:

$$\tan\gamma = \frac{h'}{f_1}.$$

20. A method for determining an entrance slit configuration for an on-axis instrument as recited in claim 17, wherein the instrument spectral parameters transforming step includes the substep of determining the required shape of the entrance slit using the equation $x = cy^2$, where c is a coefficient and $$c = \frac{m\lambda}{2df_1\cos\alpha}$$

and $f_1$ is the focal length of the at least one lens.

21. A method for determining an entrance slit configuration for an on-axis instrument as recited in claim 17, wherein the instrument spectral parameters transforming step includes the substep of calculating the radius of curvature of the slit using the equation $r = 1/[2c] + 1/8ch^2$, where h is the height of the slit.

* * * * *

UNITED STATES PATENT AND TRADEMARK OFFICE
CERTIFICATE OF CORRECTION

PATENT NO.     : 6,636,305 B2
DATED          : October 21, 2003
INVENTOR(S)    : Jun Zhao et al.

It is certified that error appears in the above-identified patent and that said Letters Patent is hereby corrected as shown below:

<u>Column 8,</u>
Line 17, the phrase "on-axis Mirror A" is amended to read -- off-axis Mirror A. --

Signed and Sealed this

Thirtieth Day of December, 2003

JAMES E. ROGAN
*Director of the United States Patent and Trademark Office*